(12) United States Patent
Bulman

(10) Patent No.: US 12,508,517 B2
(45) Date of Patent: Dec. 30, 2025

(54) INTERACTIVE TOY-SET FOR PLAYING DIGITAL MEDIA

(71) Applicant: QUBS AG, Küsnacht (CH)

(72) Inventor: Hayri C. Bulman, Küsnacht (CH)

(73) Assignee: QUBS AG, Küsnacht (CH)

( * ) Notice: Subject to any disclaimer, the term of this patent is extended or adjusted under 35 U.S.C. 154(b) by 38 days.

(21) Appl. No.: 18/268,282

(22) PCT Filed: Dec. 18, 2020

(86) PCT No.: PCT/EP2020/087206
§ 371 (c)(1),
(2) Date: Jun. 19, 2023

(87) PCT Pub. No.: WO2022/128128
PCT Pub. Date: Jun. 23, 2022

(65) Prior Publication Data
US 2024/0050871 A1 Feb. 15, 2024

(51) Int. Cl.
*A63H 33/26* (2006.01)
*A63H 33/42* (2006.01)
*G06K 19/07* (2006.01)

(52) U.S. Cl.
CPC ......... *A63H 33/42* (2013.01); *G06K 19/0723* (2013.01); *A63H 2200/00* (2013.01)

(58) Field of Classification Search
CPC .... A63H 33/26; A63H 33/42; A63H 2200/00; A63F 13/23; A63F 13/235
See application file for complete search history.

(56) References Cited

U.S. PATENT DOCUMENTS

| | | | | |
|---|---|---|---|---|
| 5,853,327 A | * | 12/1998 | Gilboa | A63F 13/26 273/237 |
| 6,190,174 B1 | * | 2/2001 | Lam | A63H 33/42 463/43 |

(Continued)

FOREIGN PATENT DOCUMENTS

| | | |
|---|---|---|
| JP | 2018050807 A | 4/2018 |
| JP | 2020058632 A | 4/2020 |

(Continued)

OTHER PUBLICATIONS

Geronazzo, M., et al., "Creating an Audio Story with Interactive Binaural Rendering in Virtual Reality," Wireless Communications and Mobile Computing, 2019, vol. 2019, Article ID 1463204, (14 pages).

(Continued)

*Primary Examiner* — Kurt Fernstrom
(74) *Attorney, Agent, or Firm* — Pauley Erickson & Swanson

(57) ABSTRACT

An interactive toy-set and related method for playing digital media, in particular auditorily recounting a story, includes a housing (10) adapted to receive one or more placeable tokens (7). The placeable tokens each have a unique identifier incorporated and the toy-set further includes a sensing unit (11) for detecting a presence of the one or more placeable tokens (7). A control unit is adapted to select a track and a track index number from a number of indexed tracks based on the detected identifier of the one or more placeable tokens, whereby the track and track index is determined based on a specific unique role attributed to each placeable token (7). The interactive toy-set further includes an output unit for outputting the track.

20 Claims, 8 Drawing Sheets

(56) References Cited

U.S. PATENT DOCUMENTS

| | | | | |
|---|---|---|---|---|
| 6,443,796 | B1* | 9/2002 | Shackelford | A63H 33/086 273/237 |
| 6,460,851 | B1* | 10/2002 | Lee | A63F 3/00643 273/238 |
| 6,659,836 | B1* | 12/2003 | Yamasaki | G09B 1/06 446/175 |
| 6,822,154 | B1* | 11/2004 | Thai | G10H 1/26 446/408 |
| 8,444,452 | B2* | 5/2013 | Dang | A63H 5/00 446/491 |
| 8,460,051 | B2* | 6/2013 | Rudell | A63H 23/16 446/175 |
| 9,378,717 | B2* | 6/2016 | Fong | G10H 1/0083 |
| 9,446,319 | B2* | 9/2016 | Barney | A63F 13/25 |
| 9,649,565 | B2* | 5/2017 | Leyland | A63F 13/98 |
| 9,770,651 | B2* | 9/2017 | Olson | A63F 13/77 |
| 9,802,115 | B2* | 10/2017 | Cortenraad | A63F 3/00643 |
| 9,802,126 | B2* | 10/2017 | Reiche | A63F 13/30 |
| 10,155,156 | B2* | 12/2018 | Jaqua | A63F 3/00643 |
| 11,113,986 | B2* | 9/2021 | Cheng | G06F 3/0321 |
| 11,517,802 | B1* | 12/2022 | Henderson | A63F 13/235 |
| 11,559,751 | B2* | 1/2023 | Trickett | A63H 18/16 |
| 11,669,134 | B2* | 6/2023 | Miki | G06K 7/10356 463/39 |
| 2009/0315258 | A1* | 12/2009 | Wallace | A63F 3/00643 273/238 |
| 2015/0375115 | A1 | 12/2015 | Bunting et al. | |
| 2016/0287979 | A1* | 10/2016 | Akavia | A63H 33/42 |
| 2016/0314609 | A1 | 10/2016 | Taylor et al. | |
| 2016/0375373 | A1* | 12/2016 | Fassbender | A63H 3/28 446/397 |
| 2019/0030452 | A1 | 1/2019 | Fabender et al. | |
| 2019/0156222 | A1 | 5/2019 | Emma et al. | |
| 2020/0330857 | A1 | 10/2020 | Barney et al. | |
| 2020/0384372 | A1 | 12/2020 | Candelore et al. | |

FOREIGN PATENT DOCUMENTS

| | | |
|---|---|---|
| WO | WO 99/32203 A1 | 7/1999 |
| WO | WO 2017/129349 A1 | 8/2017 |
| WO | WO 2018/025067 A1 | 2/2018 |
| WO | WO 2019/043716 A1 | 3/2019 |

OTHER PUBLICATIONS

EPO (Riswijk, NL), English language version of the International Search Report, Form PCT/ISA/210, for International Application PCT/EP2020/087206, Sep. 14, 2021 (3 pp.).

EPO (Munich), English version of the Written Opinion of the International Searching Authority for International Application PCT/EP2020/087206, Sep. 14, 2021 (9 pp.).

Australian Government IP, "Examination Report No. 1 for standard patent application," for Austrialian Patent Application No. 2020481427, dated Nov. 6, 2024 (6 pages).

European Patent Office (EPO), "Communication," and "Form EPO 1503 03 82,European Search Report," for European Patent Application No. 24203878.4, dated Apr. 11, 2025 (5 pages).

* cited by examiner

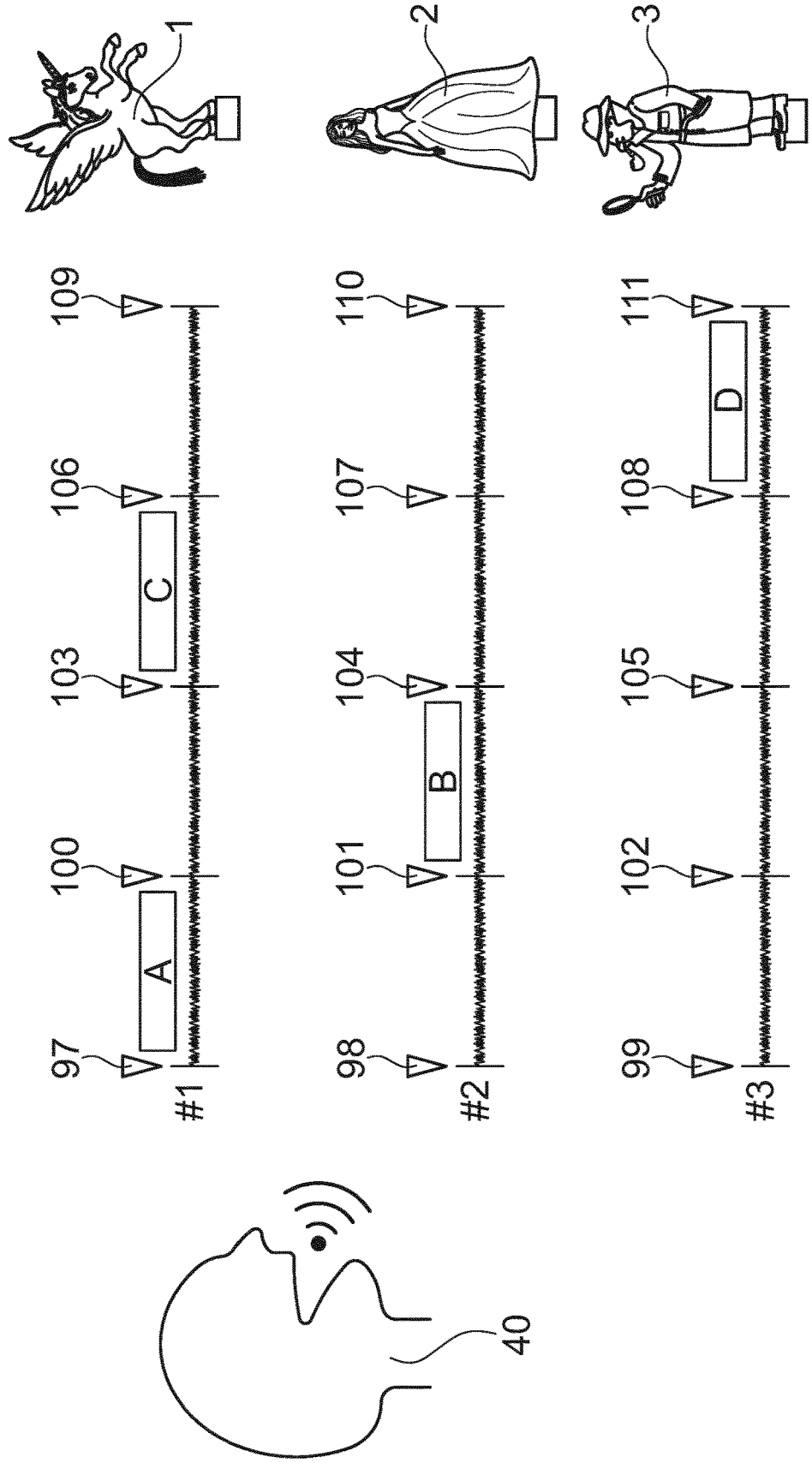

INTERACTIVE TOY-SET FOR PLAYING DIGITAL MEDIA

CROSS REFERENCE TO RELATED APPLICATION

This application is a National Phase filing in the United States, under 35 USC § 371, of PCT International Patent Application PCT/EP2020/087206, filed on 18 Dec. 2020. This application is hereby incorporated by reference herein in its entirety and is made a part hereof, including but not limited to those portions which specifically appear hereinafter.

BACKGROUND OF THE INVENTION

Field of the Invention

The present invention relates to an interactive toy-set for playing digital media and a method for operating an interactive toy-set.

Discussion of Related Art

Recent progress in the field of music and audio players for children has seen the rise of haptically enhanced audio players replacing the more traditional cassette recorder and CD player. These devices include gamification aspects and provide an additional haptic stimulus by having toy figures used for interacting with the digital content. These devices use RFID/NFC readers inside a box to detect the presence of a specific RFID tag and play a specific track based on said tag. As a further commercial aspect, the toy figures are individually sold and marketed as collectables.

These devices use an intermediary computer, such as a personal computer or smartphone to manage the digital content. The digital content itself is downloaded onto these boxes from a cloud. Connectivity and use of the cloud generate a lot of data which can be used to draw conclusions on user habits and thereby gain potentially valuable marketing information.

WO 2017/129349 A1 describes a toy for replaying music or a spoken story, which includes a loudspeaker and a sensor for detecting a particular RFID tag in the proximity of the device and thereby initiate an output. The content resulting in the output is wirelessly transmitted to the device from a library for instance by an external service provider or distributor. In the most preferred embodiment, the library is cloud-based.

Still, the presently known devices lack interactivity beyond the simple starting and stopping the output by placing a figure in proximity to the detector of the box. Although an essentially haptic experience is added, the limitation makes the device only suitable for very small children as the stimulus of placing a toy figure on a specific place to start an output of an audio file is not sufficiently stimulating for older kids. Further, the choice of possible content is essentially limited to linear recounts.

There is therefore a need to provide an interactive toy-set of the mentioned type, that has an improved interactivity, as well as being able to be operated in a manner that safeguards the user's data and complies with relevant data protection standards for the, particularly considering very sensitive users such as children.

SUMMARY OF THE INVENTION

It is an object of the present invention to provide an interactive toy-set that overcomes at least one disadvantage of the state of the art. It is a particular object of the present invention to provide an interactive toy-set with improved interactivity in respect to the state of the art. It is a further object of the present invention to provide such a toy-set that can be operated in a manner that safeguards the data of the users.

At least one of these problems is solved by an interactive toy-set for playing digital media and a corresponding method for operating an interactive toy-set for playing digital media, according to the independent claims.

One aspect of the present invention is an interactive toy-set for playing digital media. In a particularly preferred embodiment, the interactive toy-set is adapted for auditorily recounting a story.

The toy-set comprises a housing adapted at receiving one or more placeable tokens. The toy-set further comprises one or more placeable tokens, each having a unique identifier incorporated. The toy-set comprises a sensing unit for detecting the presence of one or more placeable tokens. Particularly preferred, the detecting the presence of the one or more placeable tokens is a wireless detecting.

The toy-set further comprises a control unit adapted at selecting a track and a track index number from a number of indexed tracks based on the detecting the one or more placeable tokens. The track and track index are determined based on a specific unique role attributed to each placeable token. The interactive toy-set furthermore comprises an output unit for outputting the track. Alternatively, or additionally, the track and track index are determined based on a state of progress of a recount being output.

In the context of the present invention, a role can for instance be understood as a specific speaker or acting role in a recount that is a stage piece. Of course, a role can also be defined by other concepts, such as the progression of a chapter of a narrated recount, such as when new characters are introduced, or when specific chapters of a narrated recount carry a strong relation to a particular figure, all according to the discretion of the skilled artisan. In a particular embodiment, the role can be an abstract concept which triggers an output reflective of a specific sound, such as an animal sound, elemental sound, machine sound, background music or sound etc.

The interactive toy-set of the present invention has the specific advantage, that a track index can be selected based on a unique identifier, thereby enabling an output of more complex stories, such as branching stories or even interactive stories where decisions of the user can be used to alter the story told. With other words, the toy-set of the present invention has an improved interactivity.

In the context of the present invention, interactivity shall be understood as the enablement to achieve a reaction from the toy-set based on a specific action of a user. By means of an example, a specific action of a user can be the placement of a specific token on or near a housing of the toy-set. This placement can result in a change in an output the device is currently performing. This can be useful, for instance, in providing stories with interactive dialogues. A plurality of placeable tokens can be used to recite a specific story by means of changing dialogues, each one prompted for instance by placing the respective acting role in the form of a specific placeable token in an effective range of a sensing unit of the interactive toy-set.

In a particular embodiment, the sensing unit is adapted at reading the unique identifier of a placeable token and the control-unit is adapted at matching this unique identifier with a specific track.

In a particular embodiment, the housing is adapted at receiving one or more placeable tokens by providing an essentially smooth surface onto which the one or more placeable tokens can be placed.

Alternatively, and/or in addition, the housing can be equipped with notches and/or recesses adapted at receiving corresponding geometries on the one or more placeable tokens. These notches and/or recesses can be adapted at receiving one specific placeable token with a defined corresponding geometry or at receiving any one type of placeable token.

In a particular embodiment of the present invention, the housing comprises a stage like shape, such as to simulate a theatre stage where the placeable tokens can be arranged.

In a particularly preferred embodiment, the housing comprises a plurality of pedestals adapted at receiving each one of the one or more placeable tokens.

In a further particular embodiment, the stage like shape is achieved by a stage background which can be interchangeable. The stage background can, for instance, be grouped with a particular set of placeable token and can be reflective of the play, act, environment of the recount. In a particularly preferred embodiment, the stage background is a cardboard background with an illustrated front part which is reflective of the recount. Additionally, the stage background can be equipped with an own unique identifier, for example an RFID tag. The detecting of this unique identifier for the stage background can trigger suitable background output, such as background noises or sound, for example.

In this particular example the housing can be equipped with means for accommodating an interchangeable stage background, such as for instance a stage sleeve, where a corresponding flap of a stage background can be inserted.

In a preferred embodiment, the placeable tokens are of a size and shape that can be easily handled by children of ages between one and ninety-nine, for instance by having a longitudinal dimension of between 3 cm and 12 cm and/or a diameter of between 1 cm and 5 cm in the width.

In a particular embodiment, the placeable tokens comprise a base that is essentially flat, such as to enable easier placeability on the interactive toy-set.

In a particular embodiment, the tracks are in the form of digital audio files, for instance MP3, MP4, Windows Media Audio, Advanced Audio Coding, Waveform Audio File or any other type of audio file format files. The index numbers can for instance be specific locations or other information suitable at finding a specific location in the audio file. For the present invention it is not relevant, whether the audio file is compressed or uncompressed.

In a particular embodiment the track index can be performed on a particular track by creating a metadata cluster from the digital audio file, such as for instance in a particular embodiment where the chosen audio file format is WAV, resource interchange file format can be used to index the audio file by storing a specific attribute for instance a specific role of a placeable token to a chunk on a WAV file and using the resulting metadata for indexing the track. Basically, all audio file fox mats comprise such metadata that can be used for indexing.

In a particular embodiment of the present invention, the toy-set comprises a memory unit for storing at least one track. The memory unit can be an integral element of the interactive toy-set and/or additionally comprises a removable memory unit, such as a memory card or the interface to connect a drive, such as a USB flash drive with the interactive toy-set.

In a most preferred embodiment, the interactive toy-set has an integrated memory unit, such as a flash memory unit. In a further particular embodiment, the toy-set has a plurality of memory units.

In a particular embodiment the control unit can be a CPU, in a further particular embodiment, the toy set is a computer system by itself.

In a particular embodiment of the present invention, the toy-set further comprises at least one interface to connect the toy-set with a computing device storing a repository of tracks. Particularly preferred, the interface is adapted for wirelessly connecting the toy-set with a computing device storing a repository of tracks. For instance, a wireless network adapter for establishing a Wi-Fi based connection with a further device. Alternatively, and/or additionally, a Bluetooth adaptor or a Near Field Communication unit can be used for that purpose. The tracks are preferably transferred or stored in an output file format. Alternatively, or additionally, the tracks are stored and/or transferred in a store file format and processed into an output file right before being output.

In a particular embodiment, the computing device storing a repository of tracks provides access to a first database storing a repository of tracks. These tracks are preferably indexed and attributed to a specific unique role again attributed of a placeable token, In a particular embodiment, the control unit is adapted at selecting a track and track index number that is uniquely attributable to a specific unique identifier of a token. For instance, the token can be equipped with an RFID tag with a unique identifier code and which upon sensing prompts the control unit to access a specific track and thereon initiate an output of a specific position on the track chosen through a track index attributed to the said specific unique identifier. If the track with the track index number is stored in the first database, as described above, the control unit is adapted at establishing a communication connection with a computing device providing access to the repository of tracks, place a request for a specific track based on the specific unique identifier of the token triggering the request and receive a data package with the track with the track index number and either store it in a storing unit and/or process it for the output unit for outputting the track.

In a particular embodiment, the RFID tag in the token is a passive RFID tag. Alternatively, or additionally, the token comprises an active and/or semi-passive RFID tag.

In a further embodiment, the token can be equipped with an advanced RFID tag, such as for instance a high-memory tag. These tags could be adapted to hold tracks by themselves or provide more tracks and additional text and/or sound for a particular recount. Particularly preferred, the token comprises a token memory unit. Particularly suitable so-called second-generation RFID tags that comprise an antenna and an integrated circuit with a memory unit. In a particular embodiment, the token comprises a battery.

In a particular embodiment, the RFID tag in the token is adapted for a range of detection of between 0 and 300 cm or between 0 and 30 m or between 0 and 100 m, depending on atmospheric conditions and unimpeded line between reader and tag.

With this feature, the toy-set is capable of outputting a specific role that the placeable token represents. In an exemplary embodiment, this role can be defined as a specific figure in a play or story. By means of the present invention the toy-set can recount a stage play in a true dialog manner, where each of the protagonists triggers the output that is associated with the text of his specific role in a play or complex story. Of course, additionally to the individual roles represented by the placeable tokens, a narrator can either be used for prompting the user to place a specific placeable token or for providing a framing story told by the individual placeable figures upon prompting by the control unit.

In a particular embodiment, the output unit comprises at least one loudspeaker.

In a further particular embodiment, the output unit is a headset with at least one earpiece, in particular a separate headset that is physically separate from the housing and capable of establishing a wireless connection with a control unit of the toy-set, in particular a Bluetooth based wireless connection.

In a most basic implementation, the loudspeaker can be an electroacoustic transducer adapted at converting an audio signal into a corresponding sound, in the specific example described above into a recount of a story.

In a particular embodiment, the sensing unit comprises at least one means for resonant inductive coupling. Particularly preferred the sensing unit is adapted for sending and receiving electromagnetic waves adapted at activating a passive or active RFID tag.

The use of passive RFID tags in the figures make it possible to have placeable tokens with as little electronic components as needed. The placeable tokens can for instance comprise passive RFID tags, particularly preferred in their bases, which can be stored for an almost infinite amount of time, and which do not require individual batteries or energy sources beyond what can be provided by an antenna of a passive RFID tag upon coupling with the respective means for resonant inductive coupling of the toy-set.

In a particular embodiment, the unique identifier is stored on an RFID tag, in particular a passive RFID tag.

In a particular embodiment, the control unit is adapted at attributing a specific role to each one or more of the placeable tokens based on the unique identifier. Each role is attributed to a specific track index of a track, in particular a track of a recount of a story.

In a particular embodiment, the housing has a receiving area for the receiving of the one or more placeable tokens.

In a particular embodiment, the housing comprises means for releasably connecting with corresponding connecting means on the one or more placeable tokens. Particularly preferred, magnets are incorporated in the housing to releasably attach with corresponding magnets on the one or more placeable tokens.

In a particular embodiment, the housing is essentially made of a thermoplastic material. In an alternative or additional embodiment, the housing can be made of other suitably formed materials such as aluminum and/or stainless steel. The housing can be constructed from a plurality of parts and combination of materials, in a further particular embodiment.

In a particular embodiment, the housing can be made of cardboard. This embodiment is particularly attractive for providing the toy set of the present invention as a DIY set, where a fold-out cardboard can be arranged to be easily assembled and electronic component fitted therein, further increasing the interactivity of the toy set and providing a further educational feature.

In a particular embodiment, the housing can essentially be made of a natural material, such as for instance a wood material.

This enables the user to easily carry around the toy-set of the present invention and the placeable tokens are not so prone of falling off from any surface of the toy-set they are always placed on.

In a particular embodiment, the controlling unit is adapted at initiating and/or interrupting an outputting of a track based on the sensing unit detecting a presence of the one or more placeable token, respectively the sensing unit detecting a change in the presence of the one or more placeable tokens. For instance, a track can be initiated once a particular placeable token has been detected. After a certain while the user removes the placeable token. The control unit can then, for instance, interrupt the playing of the particular track. In another example, the control unit initiates a playing of a track upon the sensing unit detecting the presence of a particular placeable token. While this track is being played a further placeable token is placed on the toy-set. Once this further placeable token is detected by the sensing unit the control unit can prompt a particular jump in the track onto a further track index thereby providing an interjection into the track which would seem as if the role of the further placeable token would have spoken.

In a particular embodiment of the present invention the toy-set comprises further sensors. Particularly preferred the toy-set comprises a second sensor adapted at sensing a movement of the toy-set. This can be achieved for instance by having one or more accelerometer(s) and/or gyroscope(s) integrated into a printed circuit board inside the toy-set. Also, a GPS-module could be implemented in a particular embodiment. These sensors can be used to enrich an interactive experience of the toy-set of the present invention even further. It is possible, for instance, to assign certain functions to a detection by one or more of these sensors. Potential functions can be an on/off switch of the toy-set based on a detected movement of the device, for instance.

Alternatively, or additionally the further sensor(s), in particular the second sensor adapted at sensing a movement of the toy-set, is/are adapted at providing further interactive possibilities, such as dynamic binaural audio rendering of the recount. This can result in an augmented reality type of experience. Suitable methods for implementation of creating spatialised soundscapes are described by Geronazzo, M. et. al (Michele Geronazzo, Amalie Rosenkvist, David Sebastian Eriksen, Camilla Kirstine Markmann-Hansen, Jeppe Kohlert, Miicha Valimaa, Mikkel Brogaard Vittrup, Stefania Serafin, "Creating an Audio Story with Interactive Binaural Rendering in Virtual Reality", Wireless Communications and Mobile Computing, vol. 2019, Article ID 1463204, 14 pages, 2019).

In a particular embodiment, the control unit, if any the interfaces, the sensors and the memory unit are components on a printed circuit board.

In a particular embodiment, the toy-set of the present invention comprises an energy source. The energy source can be a chargeable battery which comprises a battery charger either by means of inductive coupling or by means of providing a physical connection, such as a USB interface for example.

In a particular embodiment, the toy-set comprises a display means. The display means can, for instance, be a color liquid crystal display (LCD) or an organic light emitting diode (OLED). The display screen can be adapted at displaying essential information for the operation of the educational toy-set or can be used to enhance the experience of the user.

In a particular embodiment, the display is adapted at displaying the recount in text that is being output by the device. This implementation enables a user to simultaneously read the text the different placeable tokens in their roles are reciting.

In a particularly preferred embodiment, the display means is at the same time an area where the placeable tokens are placeable on. In this embodiment, the display means can be an essentially flat surface onto which the placeable tokens are placeable. The display means can be adapted to be controlled by the control unit to display specific graphic elements that enhance the experience of the output of the toy-set overall. This can, for instance, be a background corresponding to the scenes of a specific recount and aid in the correct placement of the placeable tokens. If a specific recount consists of a plurality of different scenes, for example, the display can be adapted to change and reflect the specific scenes. The display can also indicate specific areas on the receiving area where the placeable tokens can be placed to provide an optimal interaction between a plurality of placeable tokens.

In a particular embodiment, the toy-set of the present invention comprises a microphone for recording sound. This embodiment enables, for instance, that the device can be voice controlled. It also further increases the interactivity of the toy-set by providing the possibility for the user to actually contribute to the recount. In the previously described example, where the recount is akin to a stage play with a plurality of roles represented by means of the placeable tokens, a particular role can be reserved for the user. The microphone can be used to record and detect the user's role as spoken. A specific voice recognition software which can be easily provided by means of connectivity of the toy-set of the present invention with an external device that is capable of voice recognition, for instance a smartphone, can interpret the text spoken by the user and either determine whether the role has been correctly spoken or react in any other fashion.

In a particularly preferred embodiment, the microphone is adapted at storing a sound file in the memory unit. This enables customization of the toy-set of the present invention and also further improves the interactivity of the toy-set. The toy-set enables a user to have their own stories saved on the toy-set which then can for instance be attributed to a specific unique identifier. With this system a user can create custom stories for particular roles of placeable figures that are output upon placing the placeable figures in the effective range of any sensing unit of the toy-set of the present invention.

In a particular embodiment, the toy-set is adapted at recording sound by means of an additional periphery device such as a personal computer and/or smartphone. The device can be adapted to connect to the internet and/or a file repository to download pre-recorded sound files.

In a particular embodiment of the present invention, the control unit is adapted at receiving and processing a stream of the track. In this embodiment a provider can be configured to provide the contact for the toy-set of the present invention, for instance. This can be in the form of a stream. The unique identifier of the placeable tokens on locks from the stream the specific tracks and the track indexes reflective of the particular output this placeable token should generate. One further advantage of using a stream is that live performances can be created by means of the toy-set of the present invention. The stream could be in the form of a live stream like a radio play, whereby the user can interact with the live stream by placing the placeable tokens inside an effective range of a sensing unit of the toy-set and thereby trigger a specific output out of the live stream. A multitude of placeable tokens can result in an almost infinite variations of a particular stream being output as an individual story.

In a particular embodiment, the toy-set comprises a decoder for locking into a content delivery network and tap into a streaming of a specific track. This alternative to downloading the tracks can help provide security for a content provider that any provided digital media content is not stored and potentially copied by the end user thereby circumventing copyright restrictions.

In a particular embodiment, a multitude of streaming channels are provided by a content delivery network. A user can unlock the specific streaming channels by providing the correct placeable token and place it in an effective range of a sensing unit of the toy-set of the present invention.

In a particular embodiment, the control unit is adapted at establishing a communication connection with a second computing device providing access to a second database storing a plurality of voice sample(s). The voice sample(s) can be matched, for instance, with a particular user identification number, such that each user is capable of accessing a particular voice sample in the second database. In this embodiment, the second computing device can be adapted at accessing at least one deep-learning algorithm that is adapted at synthesizing a voice based on a voice recording of an individual. This voice recording can be stored in the second database. The synthesized voice can then be used to generate an output file of a recount with a synthesized voice reflective of the voice recording of the individual.

The skilled artisan readily understands that all the described embodiments can be implemented in a toy-set according to the present invention in any combination that is not mutually exclusive. Further, the skilled artisan understands that the described method can further lead to specific functional features of the toy-set of the present invention.

One aspect of the present invention is a method for operating a toy-set for playing digital media. Particularly preferred the toy-set is adapted for auditorily recounting a story. The method comprises the step of detecting a presence of one or more placeable tokens. It also comprises the step of selecting a specific track and track index based on a unique identifier of the placeable token and outputting the track from said track index on.

In a particularly preferred embodiment, each token has a role attributed to in the recounted story. The detecting is preferable performed by moving the placeable token into an effective range of a sensing unit. Although the detecting can trigger a specific response from the control unit, for instance the output of a specific track on a track index, the removal of a placeable token can of course also result in a specific response from the control unit. The removal can for instance result in interruption of a specific track. It can further trigger a prompt from the toy-set to either place the specific placeable token again into an effective range of the sensing unit and/or of continuing with a general narration relative to the story.

In a particular embodiment of the present invention a combination of a plurality of placeable tokens, and their placement into an effective range of a sensing unit triggers different track indexes, such as to generate a multitude of potential stories out of a single track, dependent on which track index is played in which order. For instance, the track can be adapted to comprise several scenes that are alternative scenes that are chosen once a specific placeable token has been placed on an effective range of a sensing unit. By means of an example, the recount can comprise a scene where one of the actors leaves and gets lost in the woods once the specific placeable token of the particular role is removed. If the sensing unit senses the absence of that particular placeable token from its effective range the set ceases is output. If instead that placeable token is not removed by the time the track reaches this specific track index, an alternative scene is output where the specific role remains in a group with the other placeable token and does not get lost in the wood.

In a particular embodiment of the method of the present invention the control unit stops a playing of a track upon the sensing unit detecting the absence of a particular placeable token. The detecting the absence is of course a consequence of non-detection of a presence. This can happen for instance, when a placeable token is removed from an effective range.

In a particular embodiment of the method of the present invention the step of selecting a specific track and track index based on a unique identifier of the placeable token comprises establishing a connection with a repository of tracks. This can either be performed for instance by accessing a memory unit on the toy itself, or by establishing a connection with an external media storage for instance with a content delivery network.

In a particular embodiment, the method of the present invention comprises the step of accessing a deep-learning algorithm that takes in voice recordings of an individual and is able to synthesize a voice that is very similar to an original voice of the individual. This synthesized voice can be used to narrate a recount or parts thereof according to the present invention. In a further embodiment, a plurality of such voices can be used to narrate a recount or parts thereof according to the present invention, for instance for narrating different roles as described above.

In the context of the present invention, the accessing of a deep-learning algorithm can comprise the utilizing of machine learning algorithms supported by artificial intelligence networks, such as for instance artificial neural networks. Systems based on deep-learning algorithm that take in voice recordings of an individual and synthesize a voice that is very similar to almost indiscernible to an original voice of the individual are available to the skilled artisan.

In a particular embodiment of the method of the present invention, the method comprises the step of first accessing a database with at least one voice recording of an individual and subsequently accessing the deep-learning algorithm to generate an output file of a recount with a synthesized voice reflective of the voice recording of the individual. The output file can then be used for outputting the track as outlined above.

In practice this can be used to create a digital distribution system with basic recounts that can be individually purchased and streamed and/or downloaded or otherwise read into an operating system of a toy set of the present invention. Each of the recounts can be output with a custom chosen voice, such as for instance a synthesized voice generated on the basis of a voice sample stored and/or otherwise deposited with the digital distribution system, such as for instance by means of a unique user account.

In a particular embodiment of the method of the present invention, the deep-learning algorithm is adapted to synthesize a voice based on a voice recording of an individual in essentially real time, in particular with a lag of below 1000 ms, preferably below 500 ms. This enables a recount being output with a predetermined set of synthesized voices based on voice recordings of an individual while a detecting a presence of one or more placeable token takes place and the placeable tokens are changed and/or altered within an effective range of any one sensor of the toy set. The low lag increases the interactive experience while using the toy set and provides a generally good responsiveness.

In a particular embodiment of the method of the present invention the detecting a presence of one or more placeable tokens comprises wireless scanning an effective range for a presence of one or more placeable tokens. The wireless scanning can be continuously performed or intermittently at specific time intervals.

In a specific embodiment of the present invention the wireless scanning is performed upon reaching a particular point in a track. For instance, if a track consists of a story recounted on the bases of a multitude of placeable tokens acting as specific roles the time point the wireless scanning is performed corresponds to the time point a specific role should recite a part in the recount.

In a particular embodiment of the present invention the step of selecting a specific track and track index based on a unique identifier of the placeable token comprises selecting the specific track index based on a progress of the track at a given point. This means that for each a unique identifier basically a plurality of track indexes can be chosen by the control unit. The control unit choses an appropriate track index based on the progress of the story. The progress of the story provides the contextual frame into which a specific track index should fit at any time. Thereby a multitude of story involvements becomes possible with just a couple of placeable tokens by altering the order in which they are placed on an effective range of a sensing unit.

In a particular embodiment of the present invention a sound is recorded by means of a microphone and attributed to a specific unique identifier of a token. This can for instance be done by providing a specific customization mode in the toy-set of the present invention. In this toy customization mode, a user can speak an own text that is recorded by the toy-set and attributed to a specific selected placeable token. In a later recount mode, the spoken text can be output again upon placement of the placeable token inside an effective range of a sensing unit of the toy-set of the present invention.

One aspect of the present invention is a computer program product. The computer program product is adapted to be run in full or at least in part on a control unit as previously described, in particular a control unit adapted at selecting a track and a track index number from a number of indexed tracks based a detecting one or more placeable token(s), whereby the track and track index is determined based on a specific unique role attributed to each placeable token.

The computer program product is adapted at performing the previously described method, comprising the steps: a) detecting a presence of one or more placeable token(s), in particular whereby each token has a role attributed to in the recounted story; b) selecting a specific track and track index based on an unique identifier of the placeable token, and c) outputting the track from said track index on.

In a particular embodiment, the computer program product is adapted at generating an output for outputting the track as an auditorily recounting of a story, in particular by generating a voice output as an auditorily recounting of a story. The computer program product is adapted at accessing deep-learning algorithms and/or access computer systems comprising such deep-learning algorithms that are capable of generating synthetic voice outputs similar to original real person voices.

In a particular embodiment, the computer program product is an operating system of the toy set. In the context of the present invention, this can be understood as providing a software basis for running all internal software components and manage connectivity and input/output with external devices and/or networks. Suitable operating systems can be based on a specifically adapted and customized Linux OS. Other suitable operating systems can be used upon the skilled artisan's discretion.

With this, the toy-set of the present invention can be used with modern voice-cloning technology which enables any recounts output by the toy-set to be spoken for instance with familiar voices. The child can listen to a grandparent recounting a story or speaking a role of a character in a stage play. It would also be possible to use licenses and have famous actors and speakers for speaking specific roles. With voice-cloning technology the respective speaker would not have to speak the whole recount but a significant voice sample would suffice to generate by means of computer program and deep-learning algorithms an output in the specific real person voice for the whole recount and also for a branching story with several possible story lines, depending on the placement off placeable tokens by the user. One further advantage of voice-cloning is a reduction of cost if a famous actor or speaker is to be employed for content generation for the present toy-set, as the whole speaking time for a recount can be significantly reduced.

The toy-set of the present invention enables the creation of a distribution system that has a repository of recounts that can be chosen for output and enrich the recounts with interactive elements, shifting dialogues and branching stories. Furthermore, the toy-set provides the possibility to create highly customized content for the output of a recount. The possibility of using synthesized voices based on real recordings enables, for instance, to have recounts be told to kids by loved ones, such as grandparents, regardless of distance.

In the following section, the present invention is further illustrated by means of figures and specific examples, without being limited thereto.

The skilled artisan further recognizes advantages implementations and embodiments by studying these examples. The figures are shown for illustrative reasons and are schematic and not intended in scale.

BRIEF DESCRIPTION OF SEVERAL VIEWS OF THE DRAWINGS

FIG. 5 shows schematically a track and track index as attributed to specific roles of placeable token;

FIG. 6b shows a set of placeable tokens for use with the toy-set of FIG. 6a;

DETAILED DESCRIPTION OF THE INVENTION

Figure 1:
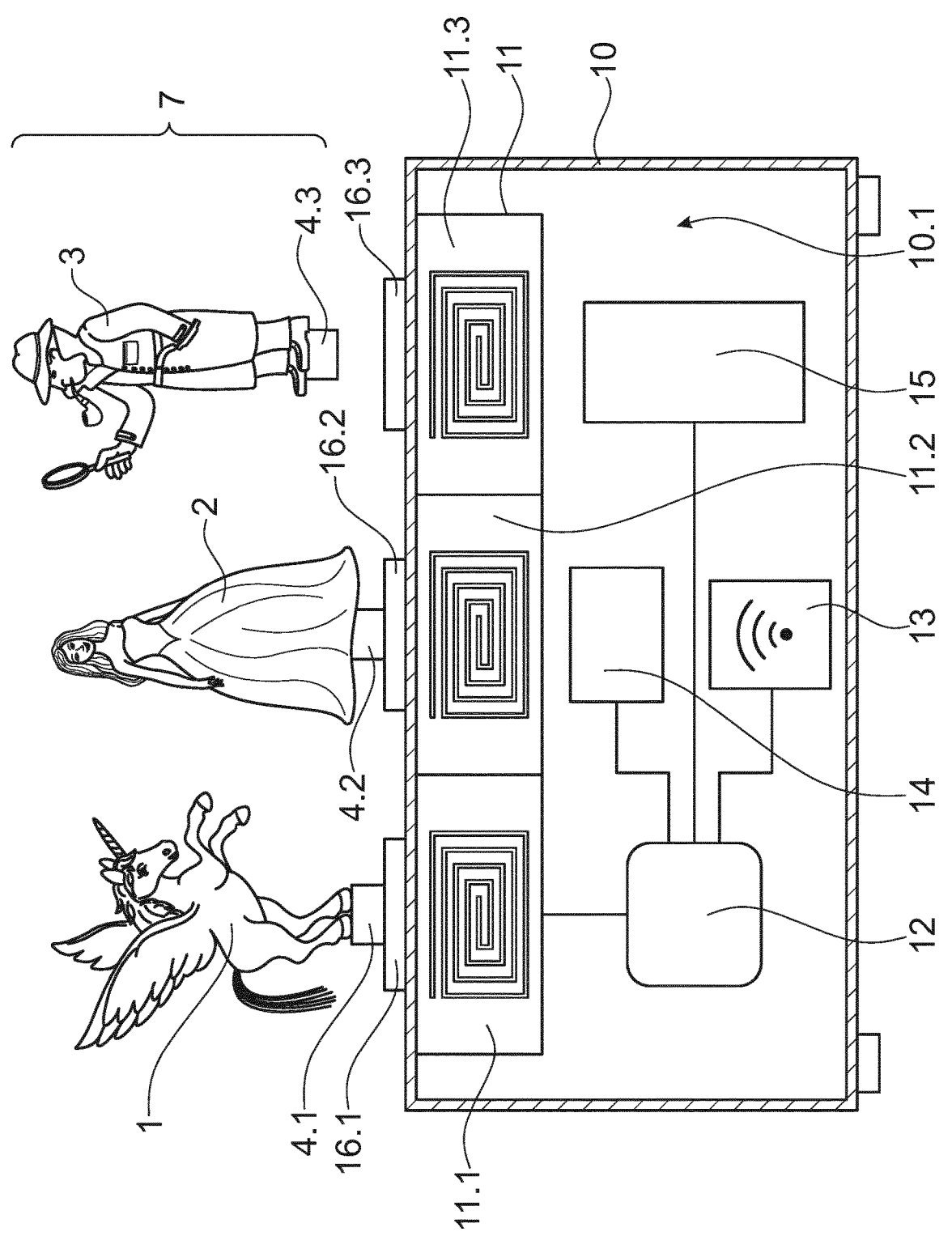
FIG. 1 shows schematically an interactive toy-set according to the present invention.

FIG. 1 is a schematic representation of a toy-set according to the invention. The toy-set comprises a housing 10 and in the present example three placeable tokens 7, which are separate from the housing 10. The number of "three" placeable tokens 7 is shown in the present example as an exemplary embodiment only, and the skilled artisan readily understands that the number of placeable tokens 7 can vary depending on the intended use of the toy-set and can be adapted for instance to satisfy the preferences of particular target age groups, where more complex story and recounts are in higher demand and interactivity can be increased further. For practical purposes, the present example is shown with three representative placeable tokens 7 which by no means shall be understood as limiting the scope of the invention. Preferable numbers of placeable tokens can range from between two and 15, preferably between three and seven placeable tokens.

In the present example, each placeable token 7 is attributed a particular token role 1, 2, 3. Each role 1, 2, 3 can be physically represented by providing the placeable token 7 in the manner of a figurine that is indicative of the role. As an example, the presently shown placeable tokens 7 have a flying unicorn as a first role of placeable token 1, a damsel as a second role of placeable token 2 and a detective as a third role of placeable token 3.

All placeable tokens 7 comprise a token base 4.1, 4.2, 4.3. In the present example the token bases 4.1, 4.2, 4.3 comprise a unique identifier which can for instance be an RFID tag (not shown in FIG. 1).

The placeable tokens 7 can be placed on pedestals 16.1, 16.2, 16.3 that are formed on an outside of the housing 10, for instance on an essentially smooth upper surface of an essentially rectangular housing 10.

The pedestals 16.1, 16.2, 16.3 can either be of a generic type, i.e., adapted to receive any one of the placeable tokens' 7 base, or be specific to interact with a particular base 4.1, 4.2, 4.3 of a placeable token 7.

In the present example, the pedestals 16.1, 16.2, 16.3 are adapted to receive any one of the placeable tokens 7 and the placeable tokens 7 can be placed in any order.

The housing 10 defines a housing interior 10.1, which contains electronic components. The housing 10 is of a form and shape that can preferably be easily carried by a child, such as to give the toy-set of the present invention a portable function. The housing 10 can be formed by injection moulding thermoplastic materials or by other suitably formed materials such as aluminum and/or stainless steel which can provide a higher quality experience. These materials are formable for instance by deep drawing. The housing 10 can be constructed from a plurality of parts and combination of materials.

Suitable sizes for the housing 10 can range in between 5 and 30 cm edge length and between 2 and 20 cm of height. The present form is shown as an essentially rectangular shape for illustrative purposes only. The housing 10 can further comprise handles, buttons, and grip areas at the discretion of the skilled artisan for example to further increase customer acceptance.

The electronic components comprise a sensing unit 11, which in the present example consists of a plurality of sensors 11.1, 11.2, 11.3 each capable of performing a NFC scan within an effective range to activate and/or detect the presence of a unique identifier of a placeable token 7 in said effective range.

In the present example the sensors 11.1, 11.2, 11.3 are active reader—passive tag system-based readers that transmit electromagnetic signals and receive authentication replies from the passive RFID tags inside the placeable tokens. Of course, the tags for the placeable tokens 7 can also be active tags for specific particular applications depending on the skilled artisan discretion.

Suitable RFID tags can be chosen by skilled artisan in dependence to the desired functionality. Suitable and readily available tags can be based on operating frequencies FCC (902-928 MHz), ETSI (865-868 MHz) with a maximum reading distance of up to 8.4 m. Preferably suitable tags are applicable to plastic, metal, cardboard, wood. Most tags come encapsulated in a cell, such as a polyester coating cell and weigh between 0.1 and 1 g. Suitable tags can also be chosen based on compliance with the protocol SO/IEC 18000-6 standard.

Other suitable tags and reader systems that are easily adaptable for use with the present invention are ST25 NFC/RFID Tags & Readers operating in frequencies of 13.56 MHz HF, and 840-960 MHz UHF, respectively.

The present example is intended to work with a frequency of between 100 and 200 kHz.

Each of the sensors 11.1, 11.2, 11.3 is adapted to cover a particular pedestal 16.1, 16.2, 16.3 to detect the presence of a placeable token in the proximity of said pedestal. Of course, a single RFID reader can also be used to cover all the pedestals jointly. As every placeable token 7 has a unique identifier by means of an RFID tag with a unique code one sensor alone can be enough to detect the presence of a number of placeable tokens 7.

A control unit 12 receives the sensed data and acts as a processor to access a memory unit 14, establishing a wireless internet connection by means of a Wi-Fi module 13 and/or drives the generation of an output wire A output unit 15.

The present example is shown as a device which can establish a Wi-Fi connection. The Wi-Fi connection can for instance be used to connect with a content delivery network and the sensing of a particular unique identifier of a placeable token 7 can be used to decode a particular streaming channel, such as to stream an audio file playback to the toy-set.

In the present example, the Wi-Fi connection can also be used to download a number of tracks onto the device and store them in a memory unit 14, which in the present example takes the form of a flash memory unit. The toy-set can of course be equipped with a removable additional or alternative memory unit, such as for instance an SD-card and be equipped with a corresponding reader. Alternatively, or additionally to the Wi-Fi module, a Bluetooth communication protocol capable chip can be integrated on the mainboard of the toy-set to also enable Bluetooth communication with further devices. In a particularly preferred embodiment, the toy-set comprises an SD-bus adapted at receiving a plurality of SD-card types, such as DS, HS, UHS-I and UHS-II suitable standard card interfaces.

One specific example can implement a connection with a computing device, such as a smartphone to enable access to system settings, downloads, or parent controls for the toy-set.

Figure 2:
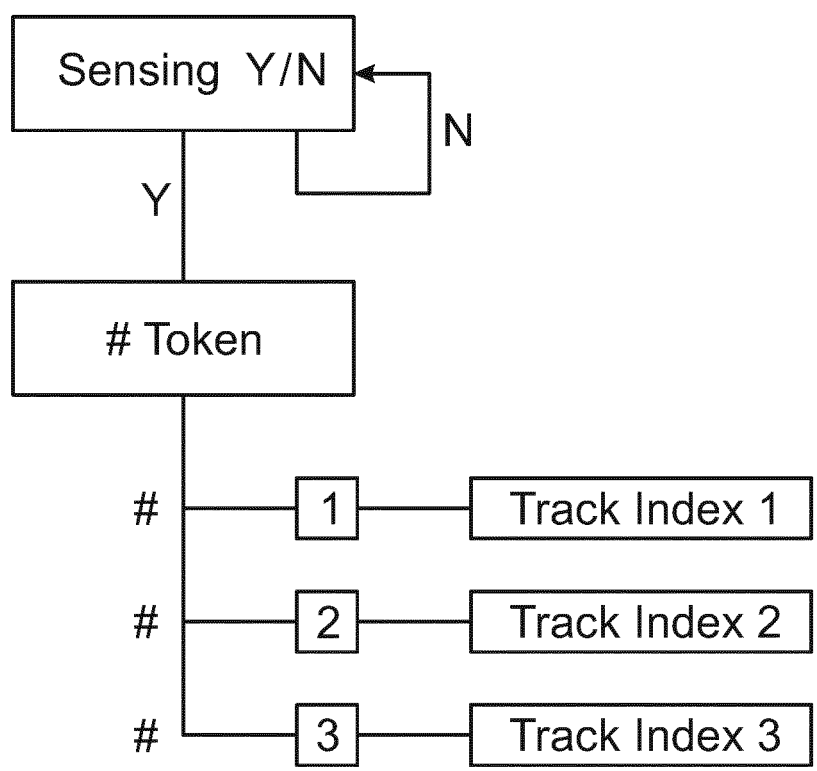
FIG. 2 shows schematically a working principal of the interactive toy-set of the present invention.

The basic working principal of the toy-set of the present invention is depicted by means of the diagram of FIG. 2. A sensing unit performs either continuously or at predetermined set frequencies a sensing of an effective range. If no placeable token, respectively unique identifier is sensed in the effective range the sensing is repeated and nothing further happens until a unique identifier is sensed.

Alternatively, or additionally, the device can perform a prompt if no placeable token is detected. The prompt can take the form of an audio output encouraging a user to place any one or a particular one of a set of placeable tokens onto a placement area.

For the present basic example, the sensing is just repeated. If a placeable token has been detected and the sensing is positive, the #token is identified by means of a unique identifier. The unique identity is then matched with a particular #track index number by the controller. Once the particular #track index number is identified, a playback of that particular track beginning from that track index number is initiated.

Figure 3:
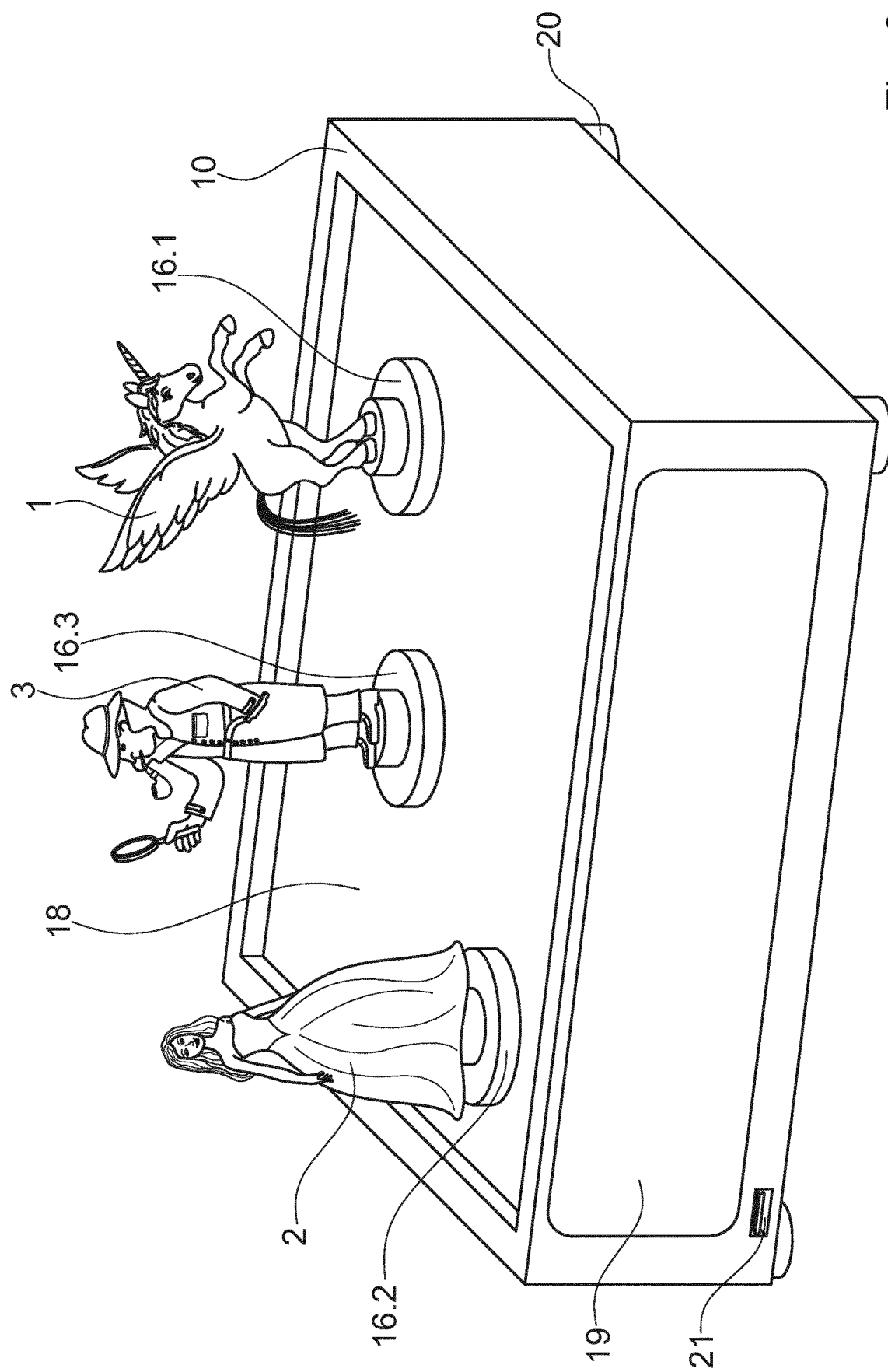
FIG. 3 shows schematically an illustration of an interactive toy-set according to the present invention with three placeable tokens.

FIG. 3 is a schematic representation of an outside view of a toy-set according to the present invention. The toy-set comprises a housing 10, which can store the electronic components as already described with FIG. 1.

The housing 10 has a recess in the top flat area which serves as a placement area 18, where a number of tokens can be placed on preformed pedestals 16.1, 16.2, 16.3.

The placeable tokens each have a placeable token role 1, 2, 3. The placement area 18 is adapted such as to ensure that all placeable tokens are placed in an effective range of at least one of the sensors inside the housing 10.

The housing 10 has an essentially smooth surface and rests on a plurality of stands 20, which can have rubber components, such as to prevent slipping of the device on smooth surfaces. A front part of the housing 10 comprises a display 19 and a USB connector 21. The USB connector can be of any one type of USB 1.1 to 2.0 or even 3.0 upon discretion of the skilled artisan.

The display 19 is an LCD display that can be adapted to depict either settings or menus or even provide an additional output by showing video sequences or outputting a text as being recounted by the toy-set. In a particular example, though, the display can be a touchscreen and further increase the interactivity of the device.

In a particular embodiment of the toy-set of the present invention, the display is a touchscreen adapted at providing a number of dialogue options for any one of the roles in a placement area. The user can select from a number of predetermined dialogue options that then result in a specific output by means of an audio output from the toy-set.

Figure 4:
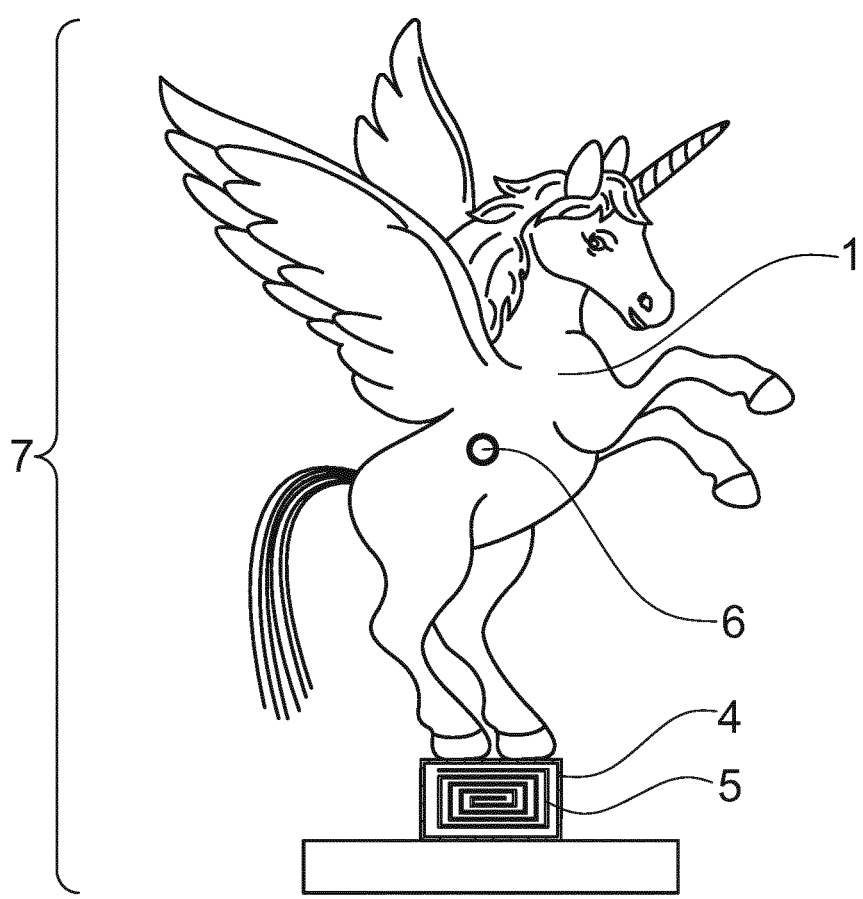
FIG. 4 illustrates a placeable token for use with the toy-set according to FIGS. 1 and 3.

FIG. 4 is a detailed view of the flying unicorn role placeable token 7. This placeable token 7 has a token body 6 that is representative of the role of the figure. The token body 6 can be made of plastic and suitably painted to further increase attractiveness of the placeable token 7 as a figurine. In a particular example of the present invention, the token body 6 can be customizable. With modern 3-D printing on demand services, a completely custom-made token body 6 can be individually created and ordered by a user. The token body 6 can be made to be joinable with a particular base and can be attributed to a unique identifier, such as to enable a user to create an own set of casts for a recount that is essentially completely customizable. It is further possible to use franchising of known characters and have the token body 6 be fashioned in a way to enhance user recognition of a popular franchise character.

The present example of flying unicorn token body 6 is placed on a base 4 that contains a passive RFID tag 5 in the inside.

FIG. 5 schematically depicts how a play with a plurality of roles can be narrated by the toy-set of the present invention based on identification of a number of roles as they are placed onto the housing of the toy-set.

A narration in the form of a narrator audio output 40 begins once a first role of placeable token 1 is detected in an effective range by beginning a track number 1 output at track index 97 and speaking a narrated text A. If during or after that narrated text A has been recounted, a second role of placeable token 2 has been detected in an effective range of a sensing unit, a following track index 101 is selected by the control unit and the narrator 40 begins with speaking a text as determined by the second role of placeable token 2 on track number 2 and respective track index 101.

If during that recounting the placeable token representing the second role 2 is removed, the control unit continues with track index 103 on track number 1 of the first role of placeable token 1 which is still present. A third narrated text C is then narrated by the narrator 40. If a third role of placeable token 3 is detected, the narrator 40 continues with narrating a fourth narrated text D which is on track number 3 and identified by track index 108 of the track.

Thus, the progress of the story is always reflective of the presence of specific placeable tokens and of the progress itself by choosing a continuation that takes into account progress as well as character.

Figure 6A:
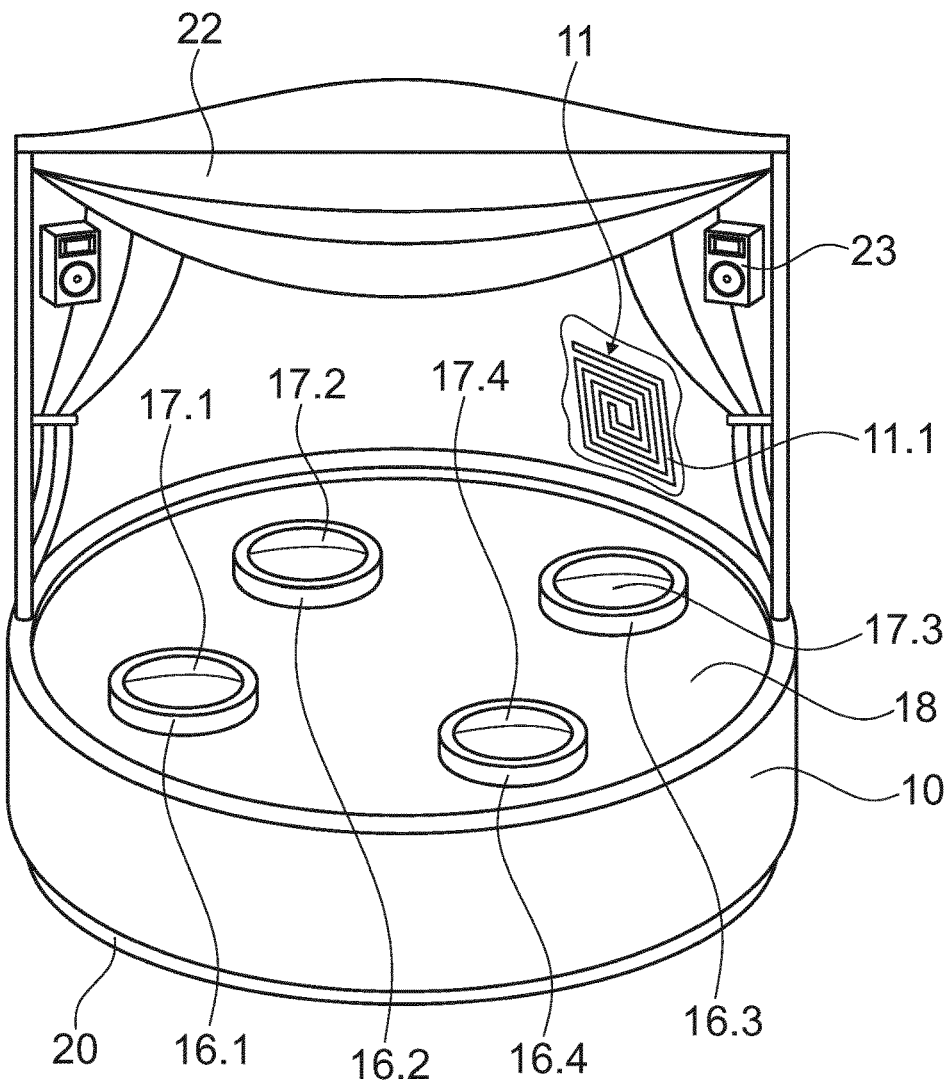
FIG. 6a shows schematically an interactive toy-set according to the present invention.

FIG. 6a shows a specific particular example of a toy-set according to the present invention adapted at performing a well-known stage act of «Pyramus and Thisbe». The toy-set is designed to look like a stage and the housing 10 has a recess with a placement area 18, where a total number of four pedestals 16.1, 16.2, 16.3, 16.4 are formed. On the pedestals LED lights 17.1, 17.2, 17.3, 17.4 are formed that can be adapted to illuminate when a specific character is acting or speaking. The toy-set has a stage 22 frame with has the loudspeakers 23 formed as classical theatre loudspeakers. In the present example, the stage 22 frame is adapted to hold a sensing unit 11, maybe in addition to a first sensing unit in the housing 10. The sensing unit 11 comprises a first sensor 11,1 capable of NFC communication with tags in an effective range, in particular in the form of an antenna.

Figure 6B:
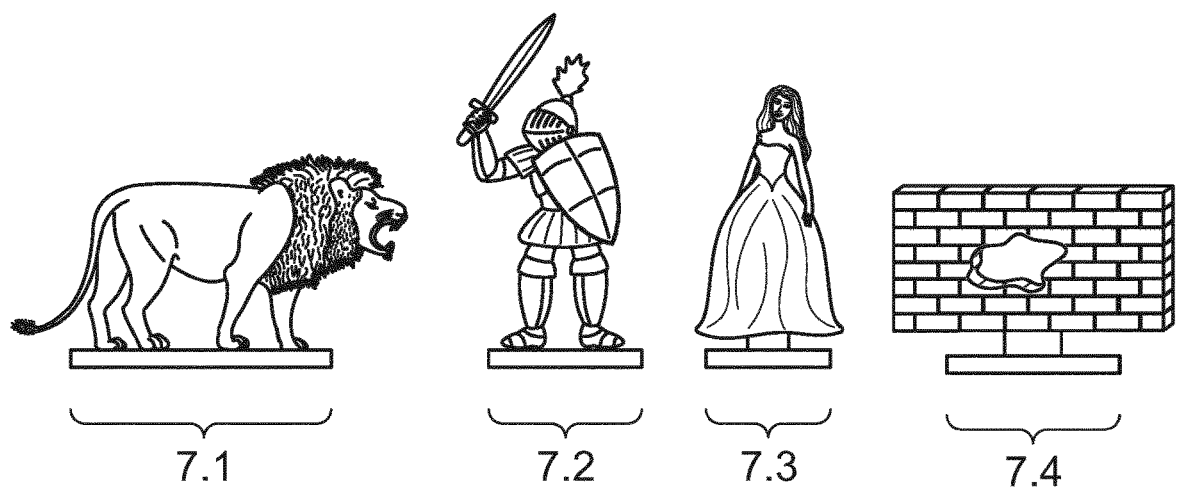

The cast of characters is shown in FIG. 6b. Of course, individual cast sets of characters can be exchanged and even though a toy-set might have a housing adapted with four or more pedestals, specific casts can consist of less or more characters. In the present example, the enactment of «Pyramus and Thisbe» comprises a placeable token set of four characters, namely a «lion role» placeable token 7.1, a «Pyramus role» placeable token 7.2, a «Thisbe role» placeable token 7.3 and a «wall role» placeable token 7.4.

Figure 7A:
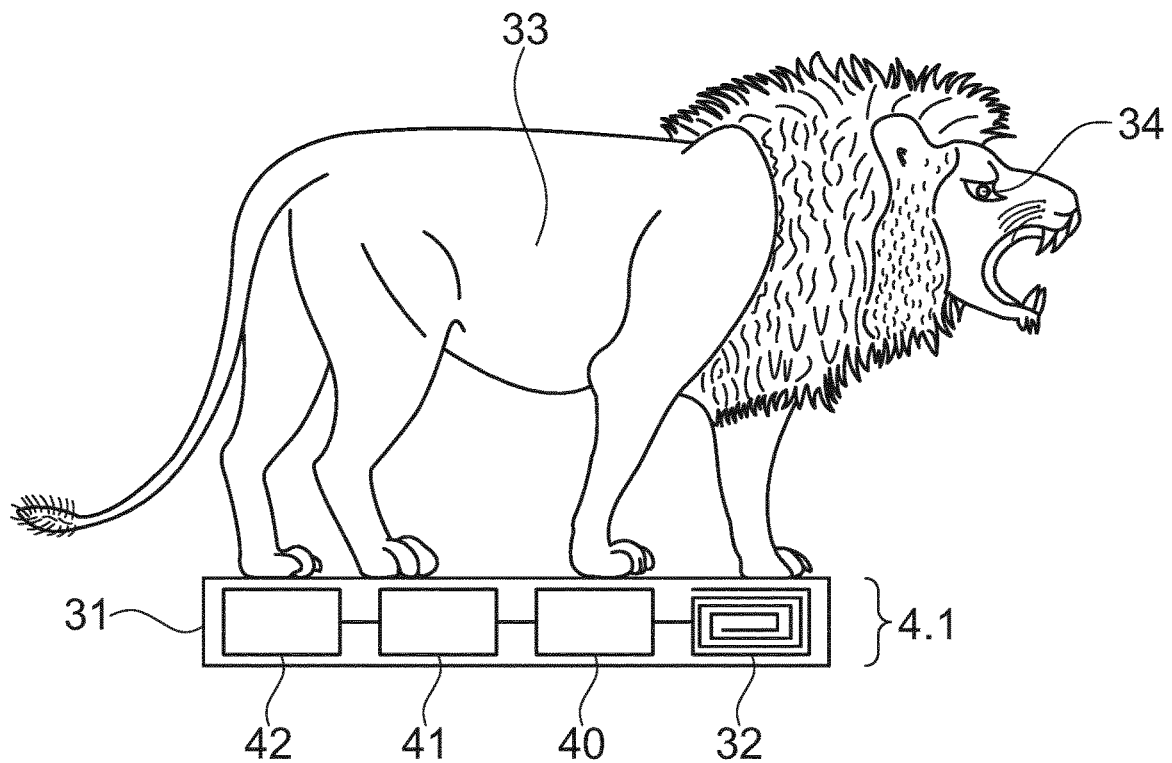
FIG. 7 shows schematically the insight of a placeable figure of FIG. 6b.

In FIG. 7a, a further embodiment of a placeable token 7 as usable with the toy-set of the present invention is depicted by means of the previous example of the «lion role» placeable token of the «Pyramus and Thisbe» set illustratively shown in FIG. 6b.

This placeable token has a «lion role» token body 33 which is crafted to look like a lion. It rests on a first base 4.1 which is formed from a base housing 31 that stores an advanced RFID tag with an antenna 32 in the inside. In the present embodiment, the lion eyes are LED lights 34. These lights can be powered by means of inductive coupling of the RFID tag in the first base 4.1 and can serve as indicator of a particular role currently being active, speaking or otherwise relevant to a specific output of the toy-set. Alternatively, or additionally, the base housing 31 comprises a token battery 41.

Figure 7B:
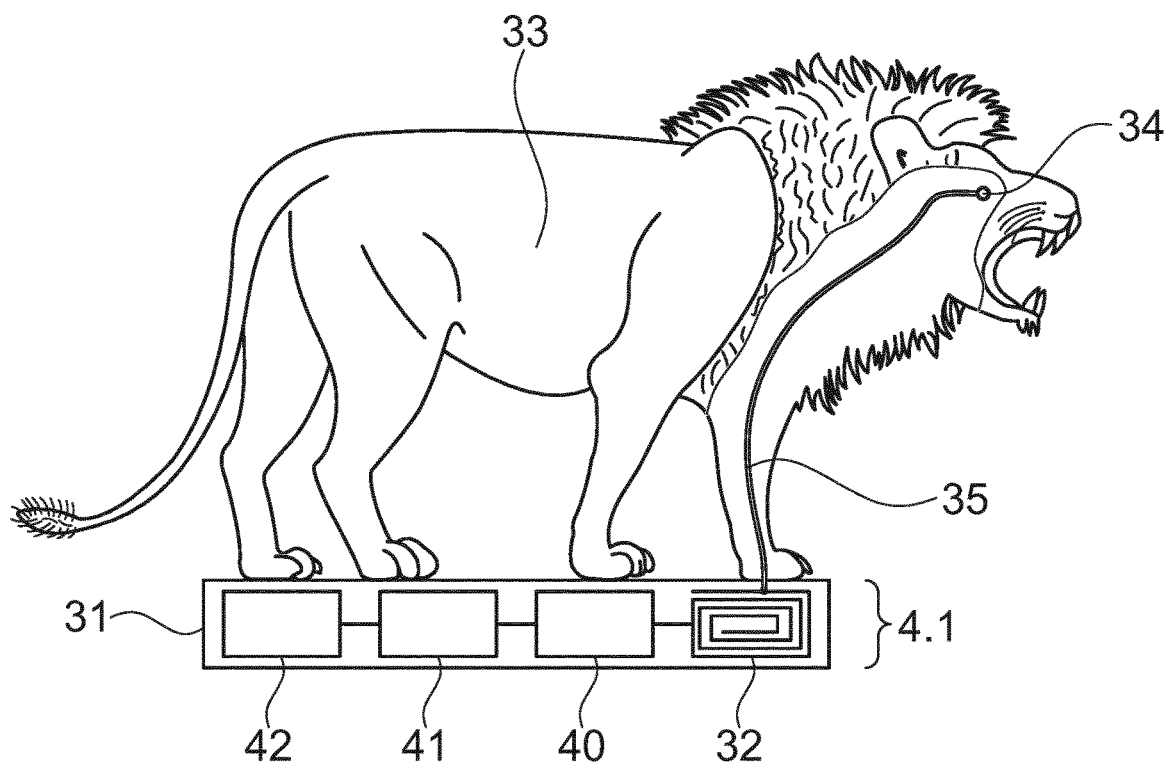

The base housing 31 further comprises a token micro controller 42. In the present example, the token micro controller 41 can access a token memory unit 43. Alternatively, or additionally the token micro controller 42 can be adapted to access the memory unit inside the housing of the toy set (not shown in FIG. 7a; see reference number 14 in FIG. 1 for reference purposes). Token batteries 41 for use with this embodiment can be adapted to be replaceable and/or chargeable. For the latter purpose, the token can be equipped with a USB port, for instance a micro-USB port (not shown). FIG. 7b shows how an electrical connection 35 is formed from the base 4.1 to the LED light 34 in the eye of the lion.

Figure 8A:
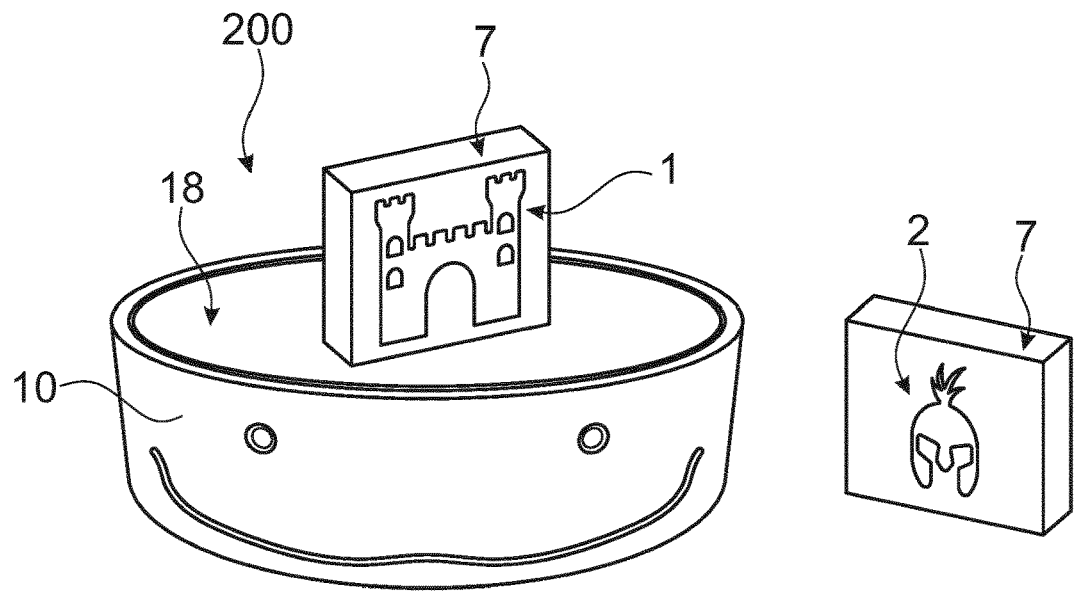
FIG. 8a shows a further particular embodiment of toy-set of the present invention.

FIG. 8a shows an interactive toy-set 200 according to an exemplary embodiment of the present invention. The toy-set 200 comprises two placeable tokens 7 for illustration purposes. The placeable tokens are wooden blocks with an image reflective of a first role of placeable token 1, a castle and a second role of placeable token 2, a knight. In practice the toy-set 200 can come equipped with a starting set of placeable tokens 7, that provide a first recount directly accessible by the user. In the present example, the toy-set comprises a housing, for housing electronic components, such as sensor, control unit, power source etc. (not shown) and onto which the placeable tokens 7 can be placed, a placement area 18.

Each token has an RFID-tag and a unique identifier.

For the present example, the user (or the user's parents) has created an account which is mapped to a user identification number. With this user identification number further casts of placeable tokens can be purchased and the respective recounts unlocked. The user identification number can for instance be used to enable the control unit of the toy-set 200 to access a repository of recounts, for instance a database, and retrieve unlocked content for the respective placeable tokens 7. In the present example, a track is retrieved with two roles, the castle 1 and the knight 2. The track is transferred into a memory unity of the toy-set or directly streamed to the toy-set and has a WAV-file format which is indexed, it has at least one first track index for the castle 1 and a second track index for knight 2. The resulting recount can incorporate scenes where the castle is introduced, the knight is introduced (each one of the placeable tokens alone on the placement area), the knight is in the castle (both tokens are on the placement area), the knight goes questing (castle is removed from the placement area) and the knight returns home (both tokens are on the placement area). This basic example with two tokens only already provides a large number of possible combination and a highly interactive recount.

Figure 8B:
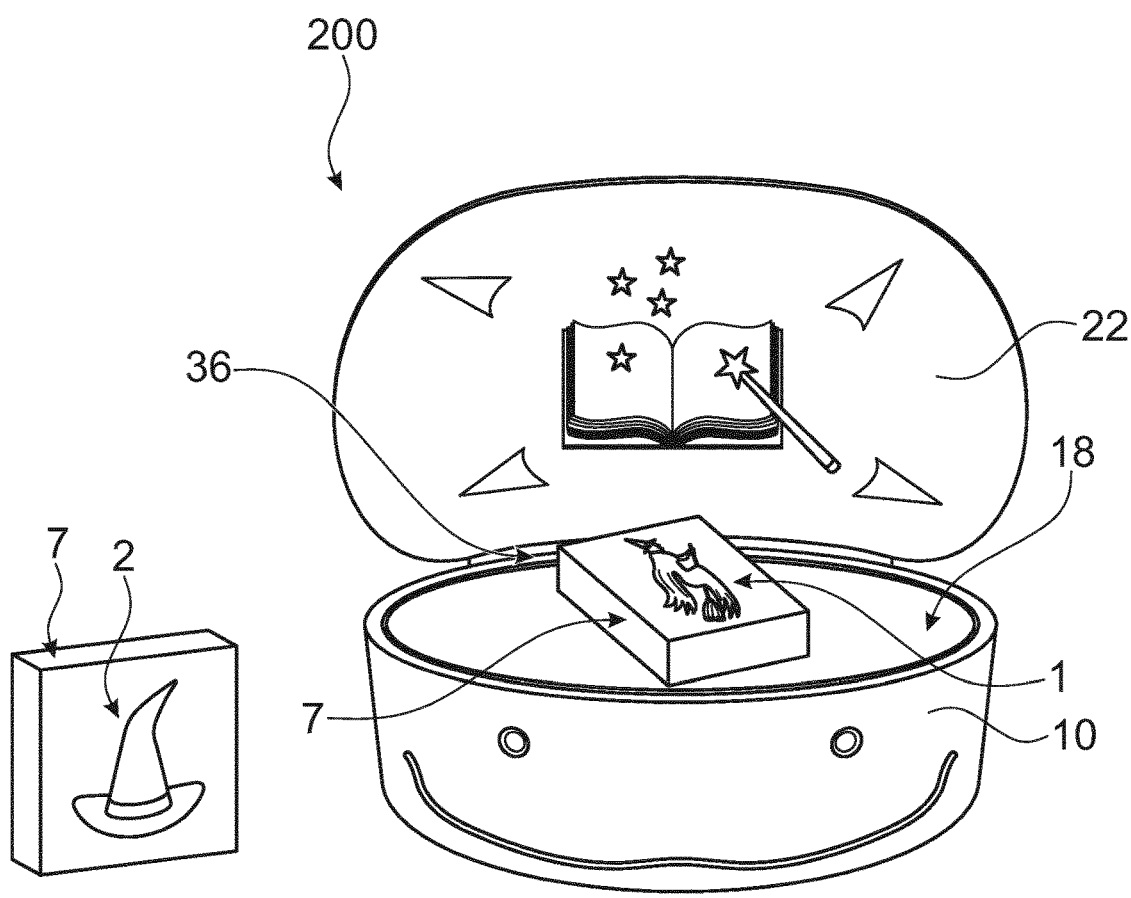
FIG. 8b shows a further particular embodiment of toy-set of the present invention.

With the help of FIG. 8b a further advantageous example shall be illustrated. The toy-set 200 comprises again two placeable tokens 7 for illustration purposes. The placeable tokens are, analogous to FIG. 8a, wooden blocks with an image reflective of a first role of placeable token 1, a good witch and a second role of placeable token 2, a magic hat.

As a further option, custom made roles can be created by the user, for instance by using microphones of the toy-set 200. The user can produce custom made placeable tokens, for instance by ordering prints or stickers of drawings or figures the user wants to have in the custom made recount and apply these to blank placeable tokens. By attributing a recorded track to a particular placeable token the recording can be made to be output upon placement of said token.

The toy-set housing 10 has a stage sleeve 36, which is adapted at receiving a stage 22. The stage itself is made of cardboard and can be part of the cast of placeable tokens, thereby setting the appropriate background for the recount. In the present example, the stage 22 is equipped with an RFID-tag and thus starts the recount by narrating the story as a narrator voice. The narrator can also act by prompting certain actions, such as requesting the placement of a particular placeable token or a combination of tokens.

Departing from the example of FIG. 8a, the cast of placeable tokens of FIG. 8b can be ordered as an expansion, or a standalone recount. The user account can be used to purchase casts, which in the present example comprises two placeable tokens 7 and a stage 22 online. As a further customization option, a particular custom voice, such as a synthesized voice generated based on a voice sample stored and/or otherwise deposited with the digital distribution system can be chosen to recount the story, For instance, the grandfather of the user (a child) can elect to purchase the shown recount and cast of placeable tokens as a gift for the child. The grandfather can deposit a voice sample in a second database (not shown). A second computing device can be adapted at accessing a deep-learning algorithm and synthesizes a voice based on the voice sample of the grandfather. The grandfather can choose to be the narrator for instance, leading the child through the adventure of the recount.

With this embodiment it becomes possible to not only create a highly interactive toy-set, but also very personal memorabilia.

The voice sample can be stored in the second database indefinitely, allowing even long after the grandfather is gone for the user (the child) to access and order recounts that are then narrated with the synthesized voice of the grandfather.

With the present invention, a toy-set as described in the introduction above is provided that has a high degree of interactivity and an almost limitless number of customization options with respect to digital media content.

The invention claimed is:

1. An interactive toy set for playing digital media, and auditorily recounting a story, the toy set comprising:
    a. a housing adapted to receive one or more placeable token(s);
    b. one or more placeable token(s), each having a unique identifier incorporated;
    C. a sensing unit within the housing for wirelessly detecting a presence of the one or more placeable token(s);
    d. at least one interface to connect the toy set with a computing device comprising a repository of indexed tracks, wherein each of the indexed tracks comprises a track including track index numbers indicating locations of specific track indexes within the track;
    e. a control unit adapted to select a track and a track index number from the repository of indexed tracks based on the detecting the unique identifier of the one or more placeable token(s), whereby the track and a track index is selected based on a specific unique role attributed to each placeable token;
    f. an output unit for outputting a story and the selected track index within the track as part of the story;
    wherein the control unit selecting a specific track index is based on a unique identifier of the placeable token, and comprises selecting the specific track index based on a progress of the story at a time of the selecting, and wherein the progress of the story is provided as a contextual frame into which a specific track index is to fit at the time of selecting.

2. The toy set of claim 1, further comprising a memory unit for storing the repository of indexed tracks.

3. The toy set of claim 1, wherein the at least one interface to connect the toy set with the computing device is an interface for wirelessly connecting the toy set with the computing device comprising the repository of indexed tracks.

4. The toy set of claim 1, wherein the control unit is adapted to select the track and the track index number that is uniquely attributable to a specific unique identifier of a token.

5. The toy set of claim 1, wherein the output unit comprises at least one loudspeaker.

6. The toy set of claim 1, wherein the sensing unit comprises at least one means for resonant inductive coupling for sending and receiving electromagnetic waves adapted at activating a RFID tag.

7. The toy set of claim 1, wherein the unique identifier is a passive RFID tag.

8. The toy set of claim 1, wherein the housing has a receiving area for receiving the one or more placeable token(s).

9. The toy set of claim 1, wherein the housing comprises means for releasably connecting with corresponding connecting means of the one or more placeable token(s), wherein magnets are incorporated in the housing to releasably attach with corresponding magnets of the one or more placeable token(s).

10. The toy set of claim 1, wherein the controlling unit is adapted to initiate and/or interrupt an outputting of a track upon the sensing unit detecting a change in a presence of the one or more placeable token(s).

11. The toy set of claim 1, wherein the toy set comprises a second sensor adapted at sensing a movement of the toy set.

12. The toy set of claim 1, further comprising a display means.

13. The toy set of claim 1, further comprising a microphone for recording sound.

14. The toy set of claim 1, whereby the control unit is adapted to receive and process a stream of the track.

15. The toy set of claim 1, wherein the selected track index continues onward until the story changes by the control unit selecting a different track index upon the token being removed or an additional token being detected.

16. A method for operating a toy set for playing digital media and auditorily recounting a story, the method comprising the steps of:
    a. detecting a presence of one or more placeable token(s), whereby each token has a role attributed in a recounted story and a unique identifier corresponding to the role;
    b. selecting a specific track and track index based on the unique identifier of the placeable token and establishing a connection with a first database storing a repository of indexed tracks, wherein each of the indexed tracks comprises a track including track index numbers indicating locations of track indexes within the track;
    C. outputting the track from the selected track index onward until the token is removed or an additional token is detected;
    wherein the selecting the specific track and track index is based on the unique identifier of the placeable token, and comprises selecting the specific track index based on a progress of the story at a time of the selecting, and wherein the progress of the story is provided as a contextual frame into which a specific track index is to fit at the time of selecting.

17. The method of claim 16, whereby step a) comprises wirelessly scanning an effective range for a presence of one or more placeable token(s).

18. The method of claim 16, whereby step b) comprises selecting the specific track index based on a progress of the track at a given point.

19. The method of claim 16, whereby a sound is recorded by means of a microphone and attributed to a specific unique identifier of a token.

20. A non-transitory computer-readable medium having stored thereon a set of instructions executable by a processor of a host computer system for operating a toy-set according to claim 1, whereby the computer program product is adapted to run in full or at least in part on the control unit adapted to select a track and a track index number from a number of indexed tracks based on a detecting one or more placeable token(s), whereby the track and track index is determined based on a specific unique role attributed to each placeable token.

* * * * *